(12) United States Patent
You (10) Patent No.: US 10,970,337 B1
(45) Date of Patent: Apr. 6, 2021

(54) METHOD AND DEVICE FOR OUTPUTTING RESULT OF OPERATIONS USING DATA SOURCES OF DIFFERENT TYPES

(71) Applicant: SECULAYER CO., LTD., Seoul (KR)

(72) Inventor: Jin Sang You, Gyeonggi-Do (KR)

(73) Assignee: Seculayer Co., LTD., Seoul (KR)

( * ) Notice: Subject to any disclaimer, the term of this patent is extended or adjusted under 35 U.S.C. 154(b) by 0 days.

(21) Appl. No.: 17/018,780

(22) Filed: Sep. 11, 2020

(30) Foreign Application Priority Data

Aug. 6, 2020 (KR) .......................... 10-2020-0098449

(51) Int. Cl.
  *G06F 16/903* (2019.01)
  *G06F 16/242* (2019.01)
(52) U.S. Cl.
  CPC .... *G06F 16/90335* (2019.01); *G06F 16/2433* (2019.01)
(58) Field of Classification Search
  CPC .................. G06F 16/90335; G06F 16/2433
  See application file for complete search history.

(56) References Cited

U.S. PATENT DOCUMENTS

| 5,623,652 A  * | 4/1997 | Vora ...................... G06F 16/338 |
| | | 707/742 |
| 7,096,229 B2 * | 8/2006 | Dettinger ................ G06F 16/24 |
| 2012/0158765 A1* | 6/2012 | Kumar ................ G06F 16/3325 |
| | | 707/766 |

FOREIGN PATENT DOCUMENTS

KR    10-2017-0083569      7/2017

* cited by examiner

*Primary Examiner* — Cam Y T Truong
(74) *Attorney, Agent, or Firm* — Emerson Thomson Bennett, LLC; Daniel A. Thomson (57) ABSTRACT

A method for outputting a result of one or more operations using data sources of different types is provided. The method includes steps of: (a) when a user query is acquired, a device (i) acquiring data elements respectively from the data sources of different types by referring to the user query, and (ii) performing main joint operations on the data elements, to thereby generate data set; and (b) the device performing data processing operations and output operations on the data set, to thereby generate an answer for the user query. It has an effect of providing the method for outputting the result of the operations using the data sources of the different types by referring to each of languages corresponding to each of the data sources.

20 Claims, 8 Drawing Sheets

| DATA SOURCE MANAGER | | X |
|---|---|---|
| ⊙ BASIC INFORMATION | | |
| * DATA SOURCE ID | DSN_01 | |
| * DATA SOURCE NAME | MySQL (CUSTOMER INFO DB) | |
| * DATA SOURCE TYPE | [1]MySQL ▼ | |
| ⊙ DNS INFORMATION | | |
| * DATABASE URL | 1.1.1.1 : 3306 | |
| * DATABASE NAME | CUSTOMER DB | |
| * USER NAME | MySQL | |
| * PASSWORD | ●●●●●●●●●● | |

310 — Basic Information section
320 — DNS Information section

METHOD AND DEVICE FOR OUTPUTTING RESULT OF OPERATIONS USING DATA SOURCES OF DIFFERENT TYPES

FIELD OF THE DISCLOSURE

The present disclosure relates to a method and a device for outputting a result of one or more operations using at least two data sources of different types.

BACKGROUND OF THE DISCLOSURE

As IT/OT technologies have developed, the amount of data being collected is increasing exponentially, and accordingly, researches on efficient way to utilize the big data having been conducted. Accordingly, technologies and tools for handling the big data also having been developed, and among them, big data analysis systems, such as, Apache Solr, Elastic search, etc., which are provided as open sources, are attracting attentions.

Herein, the Apache Solr and the Elastic search have its pros and cons, since core engines thereof are based on a search engine called a Lucene. To be specific, the Apache Solr and the Elastic search are specialized in certain functions, such as, quick search function for indexed data, simple statistical analysis function, etc., however the Apache Solr and the Elastic search are limited in other functions, such as, a function of modifying the searched data, a function of analyzing and aggregating two or more data sets, etc.

As an alternative solution, an RDB offers operations using two or more data sets from a single data source, however, it is not suitable for analyzing two or more data sets from different data sources or a massive amount of data.

Therefore, for now, if one or more operations using the data sets from different data source of different types are needed, it is inevitable to add at least one of a process of implementing a dedicated application and a process of replicating the data sets stored in different data sources into a single database. However, such processes consume significant amount of resources and time.

Thus, a method for outputting a result of operations using data source of different types is proposed as a solution.

SUMMARY OF DISCLOSURE

It is an object of the present disclosure to solve the aforementioned problems.

It is another object of the present disclosure to provide a method for outputting a result of one or more operations using data source of different types.

It is still another object of the present disclosure to provide the method for outputting the result of the operations using the data sources of the different types by referring to each of languages corresponding to each of the data sources.

It is still yet another object of the present disclosure to provide the method for outputting the result of the operations using the data sources of the different types without moving data sets of the data sources of the different types into a single database.

In accordance with one aspect of the present disclosure, there is provided a method for outputting a result of one or more operations using a first data source and a second data source of which types are different from each other, including steps of: (I) a device, if a user query is acquired, performing or supporting another device to perform (i) a process of acquiring at least one first data element and at least one second data element, each of which corresponds to each of a first search option and a second search option, respectively from the first data source and the second data source, by referring to information on one or more search options included in the user query, wherein the first search option and the second search option are included in the search options, and (ii) a process of performing one or more main joint operations on the first data element and the second data element, resulting in generating data set, by referring to information on the main joint operations included in the user query, wherein the main joint operations include at least one of a JOIN operation and an UNION operation; and (II) the device performing or supporting another device to perform one or more data processing operations on the data set and then one or more output operations thereon, to thereby generate an answer for the user query by referring to information on the data processing operations and information on the data output operations which are included in the user query.

As one example, a type of the first data source and that of the second data source are selected among a group comprised of a type of a Lucene-based search engine, a type of a RDB, and a type of a file.

As one example, before the step of (I), further including a step of: (I0) the device performing or supporting another device to perform processes of (i) acquiring first basic information and second basic information each of which includes at least one of an data source ID, a data source name, and a data source type, (ii) acquiring first DSN information and second DSN information each of which includes at least one of a Database URL, a Database Name, an User name, and a password, and (iii) setting each of data source connections corresponding to each of the first data source and the second data source by using the first basic information, the second basic information, the first DSN information, and the second DSN information, wherein, at the step of (I), the device performs or supports another device to perform (i) a process of acquiring the first data element and the second data element respectively from the first data source and the second data source by referring to the data source connections and the information on the search options, and (ii) a process of performing the main joint operations on the first data element and the second data element by referring to the data source connections and the information on the main joint operations, resulting in generating the data set;

As one example, at the process of (i) in the step of (I), the device performs or supports another device to perform (i-1) a process of accessing the first data source and the second data source by referring to each of the data source connections, (i-2) a process of acquiring the first data element and the second element by referring the first search option and the second search option each of which has been written in each language corresponding to the first data source and the second data source, and then (i-3) a process of generating a first converted data element and a second converted data element by converting a type of the first data element and a type of the second data element, and wherein, at the process of (ii) in the step of (I), the device performs or supports another device to perform a process of performing one or more main joint operations on the first converted data element and the second converted data element, resulting in generating data set, by referring to the information on the main joint operations.

As one example, at the process of (i-2) in the step of (I), the device performs or supports another device to perform at least one of (i-2-a) a process of acquiring a first sub data element and a second sub data element, each of which corresponds to a first sub search option and a second sub search option, from the first data source, wherein the first sub search option and the second sub search option are included in the first search option, and then performing one or more sub joint operations on the first sub data element and the second sub data element, to thereby generate the first data element, wherein the sub joint operations include at least one of the JOIN operation and the UNION operation, and (i-2-b) a process of acquiring the first sub data element, and then a process of generating the first data element by using the first sub data element and the second search option without performing the sub joint operations.

As one example, wherein, at the process of (i-3) in the step of (I), the device performs or supports another device to perform a process of allowing the main joint operations to be performed, after generating the first converted data element and the second converted data element by converting the type of the first data source and the type of the second data source into an identical type.

As one example, the device performs or supports another device to perform at least one of (1) a process of accessing a first specific data source among the first data source and the second data source by referring a Rest API and then a process of acquiring its corresponding data element by referring to its corresponding search option which has been written in a LuceneQL, in case a type of the first specific data source is the type of the Lucene-based search engine, (2) a process of accessing a second specific data source among the first data source and the second data source by referring a JDBC or a ODBC and then a process of acquiring its corresponding data element by referring to its corresponding search option which has been written in a SQL, in case a type of the second specific data source is the type of the RDB, and (3) a process of accessing a third specific data source among the first data source and the second data source by referring its corresponding file path and then a process of acquiring the entire third specific data source as its corresponding data element, in case a type of the third specific data source is the type of the file.

As one example, the device performs or support other device to perform (1) a process of connecting at least two commands, which are applied after the process of (ii) in the step of (a), with at least one delimiters, (2) a process of acquiring an output of a first specific command located before a certain delimiter, (3) a process of using the output as an input of a second specific command located after the certain delimiter, wherein the first specific command and the second specific command are included in the commands, and wherein the certain delimiter is included in the delimiters.

As one example, at the step of (II), the data processing operations include at least one of an aggregating operation, a data transforming operation, a filtering operation, a sorting operation, a data truncating operation, and an external function calling operation.

As one example, at the step of (II), the data output operations include at least one of a screen displaying operation, a remote RDB storing operation, and a file storing operation.

In accordance with another aspect of the present disclosure, there is provided a device for outputting a result of one or more operations using a first data source and a second data source of which types are different from each other, including: at least one memory that stores instructions; and at least one processor configured to execute the instructions to perform or support another device to perform: (I) processes of, if a user query is acquired, (i) acquiring at least one first data element and at least one second data element, each of which corresponds to each of a first search option and a second search option, respectively from the first data source and the second data source, by referring to information on one or more search options included in the user query, wherein the first search option and the second search option are included in the search options, and (ii) performing one or more main joint operations on the first data element and the second data element, resulting in generating data set, by referring to information on the main joint operations included in the user query, wherein the main joint operations include at least one of a JOIN operation and an UNION operation; and (II) processes of performing one or more data processing operations on the data set and then performing one or more output operations thereon, to thereby generate an answer for the user query by referring to information on the data processing operations and information on the data output operations which are included in the user query.

As one example, a type of the first data source and that of the second data source are selected among a group comprised of a type of a Lucene-based search engine, a type of a RDB, and a type of a file.

As one example, wherein, before the processes of (I), the processor further performs or supports another device to perform: (I0) processes of (i) acquiring first basic information and second basic information each of which includes at least one of an data source ID, a data source name, and a data source type, (ii) acquiring first DSN information and second DSN information each of which includes at least one of a Database URL, a Database Name, an User name, and a password, and (iii) setting each of data source connections corresponding to each of the first data source and the second data source by using the first basic information, the second basic information, the first DSN information, and the second DSN information, wherein, at the processes of (I), processes of (i) acquiring the first data element and the second data element respectively from the first data source and the second data source by referring to the data source connections and the information on the search options, and (ii) performing the main joint operations on the first data element and the second data element by referring to the data source connections and the information on the main joint operations, resulting in generating the data set;

As one example, at the process of (i) in the processes of (I), the processor performs or supports another device to perform (i-1) a process of accessing the first data source and the second data source by referring to each of the data source connections, (i-2) a process of acquiring the first data element and the second element by referring the first search option and the second search option each of which has been written in each language corresponding to the first data source and the second data source, and then (i-3) a process of generating a first converted data element and a second converted data element by converting a type of the first data element and a type of the second data element, and wherein, at the process of (ii) in the processes of (I), the processor performs or supports another device to perform a process of performing one or more main joint operations on the first converted data element and the second converted data element, resulting in generating data set, by referring to the information on the main joint operations.

As one example, at the process of (i-2) in the processes of (I), the processor performs or supports another device to perform at least one of (i-2-a) a process of acquiring a first sub data element and a second sub data element, each of which corresponds to a first sub search option and a second sub search option, from the first data source, wherein the first sub search option and the second sub search option are included in the first search option, and then performing one or more sub joint operations on the first sub data element and the second sub data element, to thereby generate the first data element, wherein the sub joint operations include at least one of the JOIN operation and the UNION operation, and (i-2-b) a process of acquiring the first sub data element, and then a process of generating the first data element by using the first sub data element and the second search option without performing the sub joint operations.

As one example, at the process of (i-3) in the processes of (I), the processor performs or supports another device to perform a process of allowing the main joint operations to be performed, after generating the first converted data element and the second converted data element by converting the type of the first data source and the type of the second data source into an identical type.

As one example, the processor performs or supports another device to perform at least one of (1) a process of accessing a first specific data source among the first data source and the second data source by referring a Rest API and then a process of acquiring its corresponding data element by referring to its corresponding search option which has been written in a LuceneQL, in case a type of the first specific data source is the type of the Lucene-based search engine, (2) a process of accessing a second specific data source among the first data source and the second data source by referring a JDBC or a ODBC and then a process of acquiring its corresponding data element by referring to its corresponding search option which has been written in a SQL, in case a type of the second specific data source is the type of the RDB, and (3) a process of accessing a third specific data source among the first data source and the second data source by referring its corresponding file path and then a process of acquiring the entire third specific data source as its corresponding data element, in case a type of the third specific data source is the type of the file.

As one example, the processor performs or support other device to perform (1) a process of connecting at least two commands, which are applied after the process of (ii) in the processes of (I), with at least one delimiters, (2) a process of acquiring an output of a first specific command located before a certain delimiter, (3) a process of using the output as an input of a second specific command located after the certain delimiter, wherein the first specific command and the second specific command are included in the commands, and wherein the certain delimiter is included in the delimiters.

As one example, at the processes of (II), the data processing operations include at least one of an aggregating operation, a data transforming operation, a filtering operation, a sorting operation, a data truncating operation, and an external function calling operation.

As one example, at the processes of (II), the data output operations include at least one of a screen displaying operation, a remote RDB storing operation, and a file storing operation.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views. It should be also noted that, in some implementations, triggering commands noted in the process may occur in a different order, may occur concurrently, and/or may be omitted.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled.

To allow those skilled in the art to the present disclosure to be carried out easily, the example embodiments of the present disclosure by referring to attached diagrams will be explained in detail as shown below.

Figure 1:
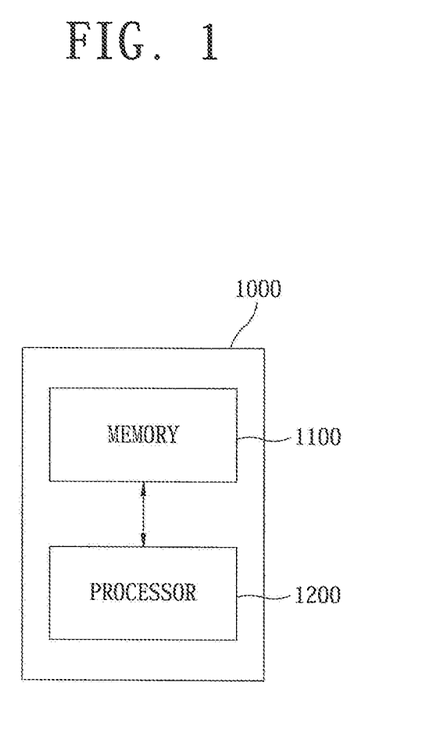
FIG. 1 is a drawing representing a device for performing one or more operations using a first data source and a second data source of which type is different from each other in accordance with one example embodiment of the present disclosure.

FIG. 1 is a drawing representing a device in accordance with one example embodiment of the present disclosure. By referring to FIG. 1, the device 1000 may include a memory 1100 which stores one or more instructions for outputting a result of one or more operations using a first data source and a second data source of which types are different from each other, and a processor 1200 which performs functions for the operations using the first data source and the second data source in response to the instructions stored in the memory 1100.

In specific, the device 1000 may typically achieve a required performance by combining one or more computing devices and one or more computer software. Herein, computing devices may include one or more computer processors, one or more memories, one or more storages, one or more input and output devices, and one or more other components conventionally included in computing device; one or more electronic communication devices, such as a router and a switch; and one or more electronic data storage systems, such as a network attached storage (NSA) and a storage area network (SAN), and herein, the computer software are one or more instructions respectively allowing the computing device to perform a corresponding function.

Additionally, the processor of the computing device may include one or more hardware configurations, such as micro processing unit (MPU), central processing unit (CPU), cache memory, data bus, etc. Moreover, the computing device may also include one or more operating systems and one or more software configurations of respective applications which serves respective purpose.

However, it should be noted that the computer device do not exclude integrated processor, which is a combined form of one or more media, one or more processors, and one or more memories.

Meanwhile, a method for outputting the result of the operations using the first data source and the second data source is explained below by referring to FIG. 2 in accordance with one example embodiment of the present disclosure.

Figure 2:
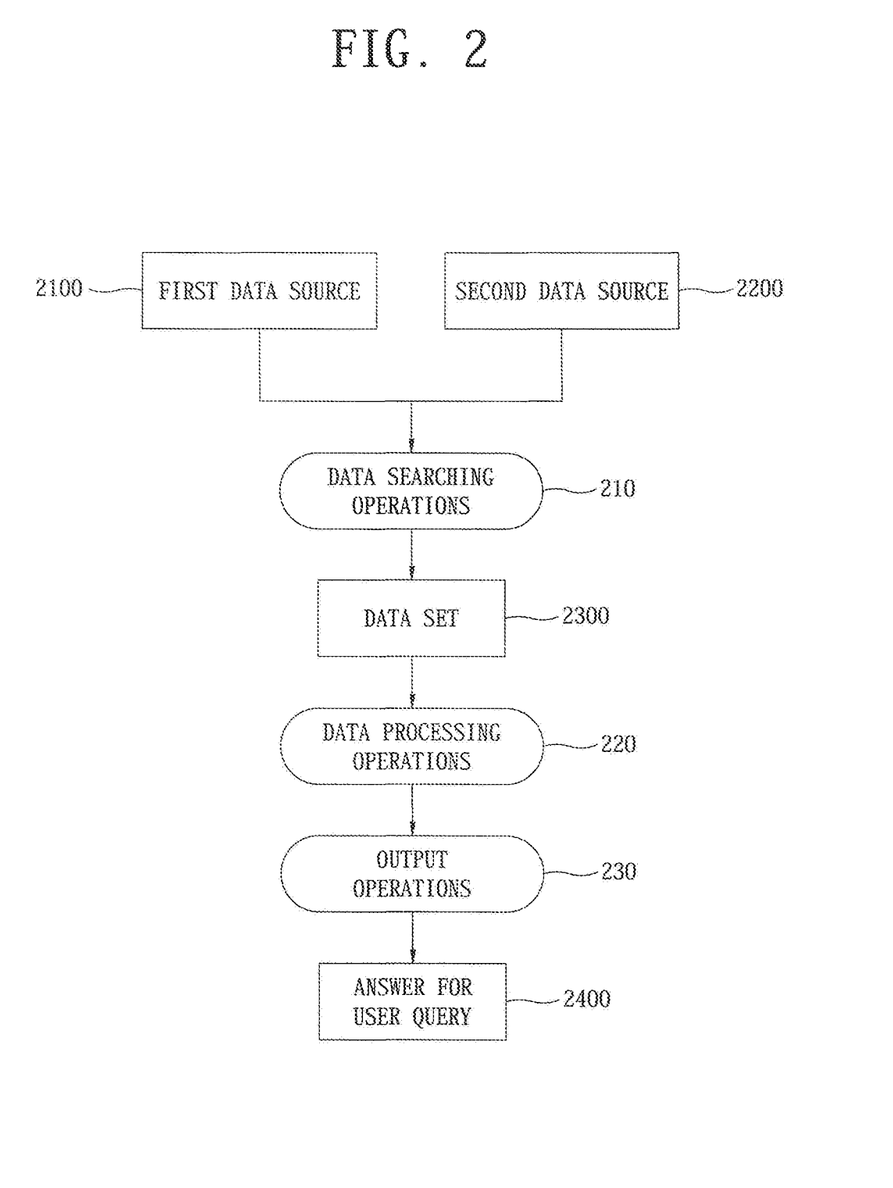
FIG. 2 is a drawing representing a method for performing the operations using the first data source and the second data source in accordance with one example embodiment of the present disclosure.

First, by referring to FIG. 2, when a user query is acquired, the device 1000 may generate or support another device to generate data set 2300 by performing one or more data searching operations 210, included in the user query, on the first data source 2100 and the second data source 2200. Then the device 1000 may generate or support another device to generate an answer for the user query 2400 by performing one or more data processing operations 220 and one or more output operations 230 on the data set 2300. Herein, the data processing operations 220 and the output operations 230 are included in the user query.

Herein, a type of the first data source and a type of the second data source may differ from each other, and may be one of a type of a Lucene-based search engine, a type of a RDB, and a type of a File.

Figure 3:
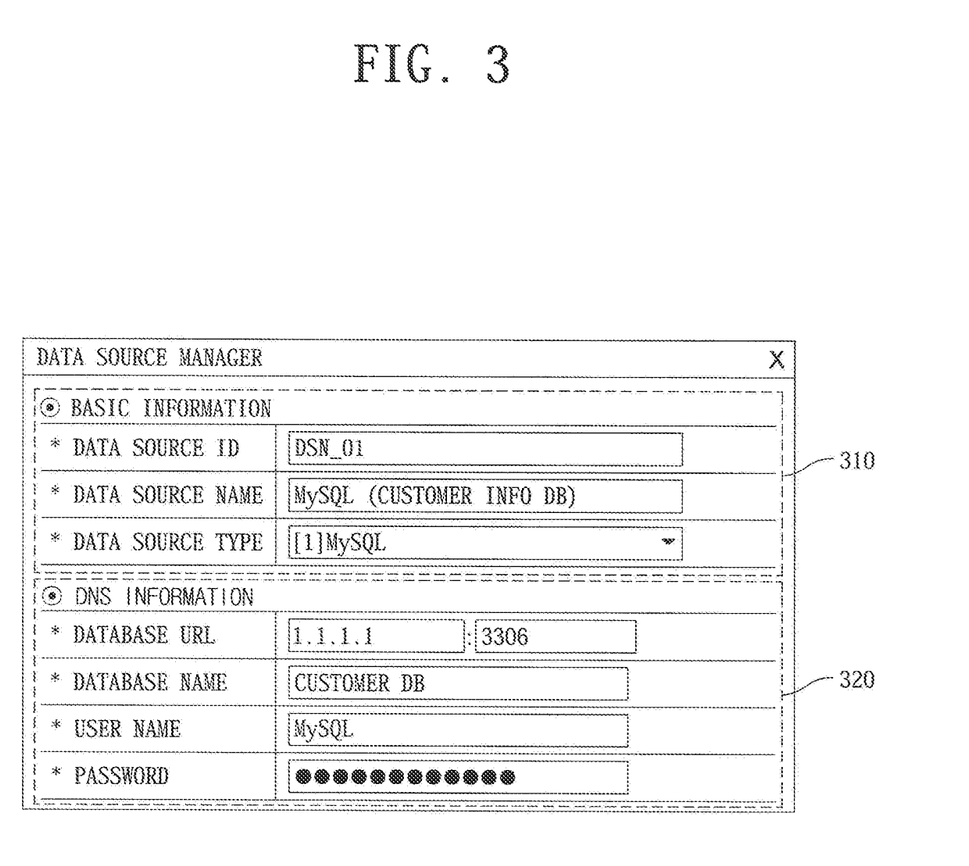
FIG. 3 is a drawing representing a UI for acquiring basic information and DSN information from a user to thereby set data source connections accordingly in accordance with one example embodiment of the present disclosure.

Meanwhile, by referring to FIG. 3, the device 1000 may provide or support another device to provide a UI 310 capable of allowing a user to input basic information on the first data source 2100 and the second data source 2200, and a UI 320 capable of allowing the user to input DSN information on the first data source 2100 and the second data source 2200, before the device 1000 acquires the user query. To be specific, the basic information may include at least one of a data source ID, a data source Name, a Data source Type, etc., and the DSN information may include at least one of a database URL, a database name, a user name, a password, etc.

Herein, the device 1000 may set or support another device to set each of data source connections of the first data source 2100 and the second data source 2200 by using the basic information and the DSN information. Then, the device 1000 may access or support another device to access to the first data source 2100 and the second data source 2200 by referring to each of corresponding data source connections.

Meanwhile, processes of performing the data searching operations on the first data source and the second data source, to thereby generate the data set are explained below by referring to FIG. 4 and FIG. 5 in accordance with one example embodiment of the present disclosure.

As aforementioned, when the user query is acquired and the data source connections are set, the device 1000 may access or support another device to access to the first data source 2100 and the second data source 2200.

Figure 4:
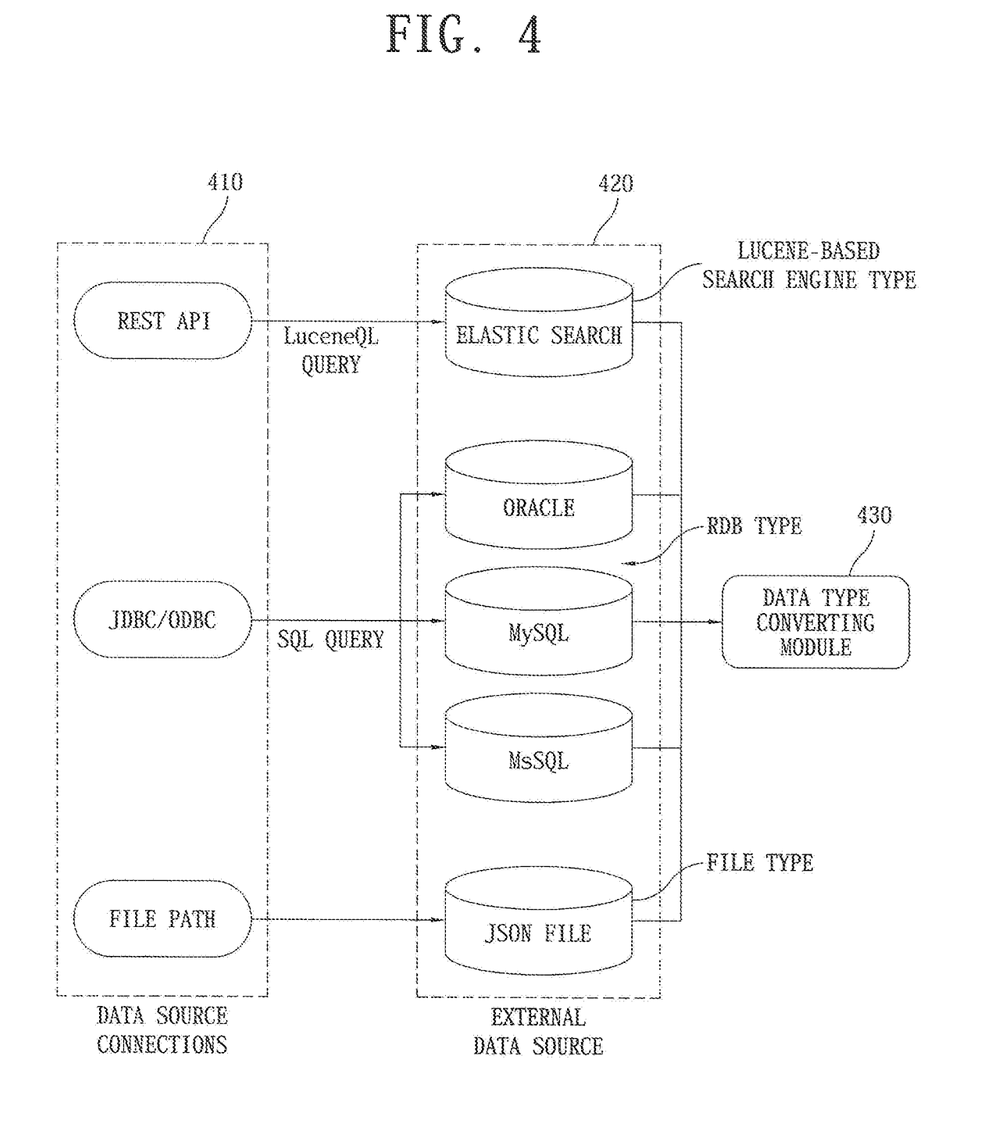
FIG. 4 is a drawing representing a method for generating a first converted data element and a second converted data element according to each type of the first data source and the second data source in accordance with one example embodiment of the present disclosure.

Herein, by referring to FIG. 4, the device 1000 may access or support another device to access external data sources 420 by referring to the data source connections 410. To be specific, in case a type of a first specific data source among the external data sources 420 is a type of the Lucene-based search engine, the device 1000 may access or support another device to access the first specific data source by referring to a Rest API among the data source connections 410, in case a type of a second specific data source among the external data sources 420 is a type of the RDB, the device 1000 may access or support another device to access the second specific data source by referring to a JDBC or an ODBC among the data source connections 410, and, in case a type of a third specific data source among the external data sources 420 is a type of the file, the device 1000 may access or support another device to access the third specific data source by referring to its corresponding file path among the data source connections 410.

Figure 5:
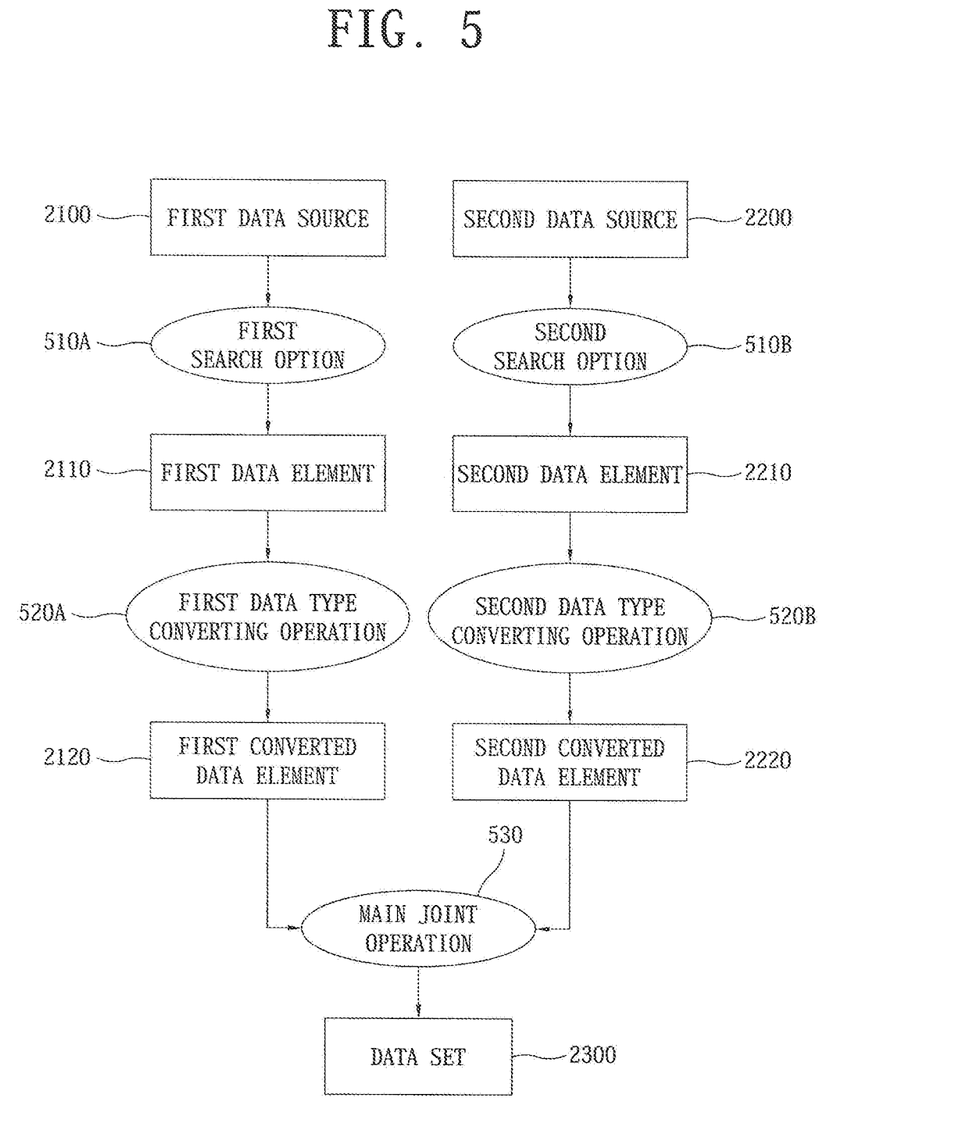
FIG. 5 is a drawing representing a process of generating data set by using the first data source and the second data source in accordance with one example embodiment of the present disclosure.

Thereafter, by referring to FIG. 5, the device 1000 may refer to or support another device to refer to information on search options included in the user query, may apply or support another device to apply a first search option 510A and a second search option 510B, which are included in the information on the search options, respectively to the first data source 2100 and the second data source 2200, and then may acquire or support another device to acquire a first data element 2110 and a second data element 2210.

Herein, by referring to FIG. 4 again, in case the type of the first specific data source is the type of the Lucene-based search engine, its corresponding search option may have been written in a LuceneQL, in case the type of the second specific data source is the type of the RDB, its corresponding search option may have been written in a SQL, and in case the type of the third specific data source is the type of the file, its corresponding search option may not exist.

To be specific, by referring to FIG. 5 again, in case the type of the first specific data source is the type of the Lucene-based search engine, the device 1000 may acquire or support another device to acquire a first specific data element corresponding to the first specific data source by referring to its corresponding search option written in the LuceneQL, in case the type of the second specific data source is the type of the RDB, the device 1000 may acquire or support another device to acquire a second specific data element corresponding to the second specific data source by referring to its corresponding search option written in the SQL, and in case the type of the third specific data source is the type of the file, the device 1000 may acquire or support another device to acquire the entire third specific data source as a third specific data element.

Thereafter, the device 1000 may refer to or support another device to refer to the information on the search options, may convert or support another device to convert the type of the first data element 2110 and the second data element 2210 by respectively applying a first data type converting operation 520A and a second data type converting operation 520B, which are included in the information on the search options, and thus may generate or support another device to generate a first converted data element 2120 and a second converted data element 2220.

To be specific, by referring to FIG. 4 and FIG. 5, the device 1000 may allow a data type converting module 430 to convert the type of the first data element 2110 and the second data element 2210 into an identical type, to thereby generate the first converted data element 2120 and the second converted data element 2220. Herein, since the first converted data element 2120 and the second converted data element 2220 have been converted into the identical type, a JOIN operation and/or a UNION operation can be applied to them. Moreover, the data type converting module 430 may be included in the device 1000, but it may not be limited thereto.

Thereafter, by referring to FIG. 5 again, the device 1000 may refer to or support another device to refer to the main joint operation included in the information on the search options, may apply or support another device to apply the main joint operation to first converted data element 2120 and the second converted data element 2220, and may generate or support another device to generate the data set 2300.

Herein, the main joint operation 530 may include at least one of the JOIN operation and the UNION operation, however it may not be limited thereto, and the main joint operation 530 may represent operations using data elements acquired from data sources of different types.

Figure 6:
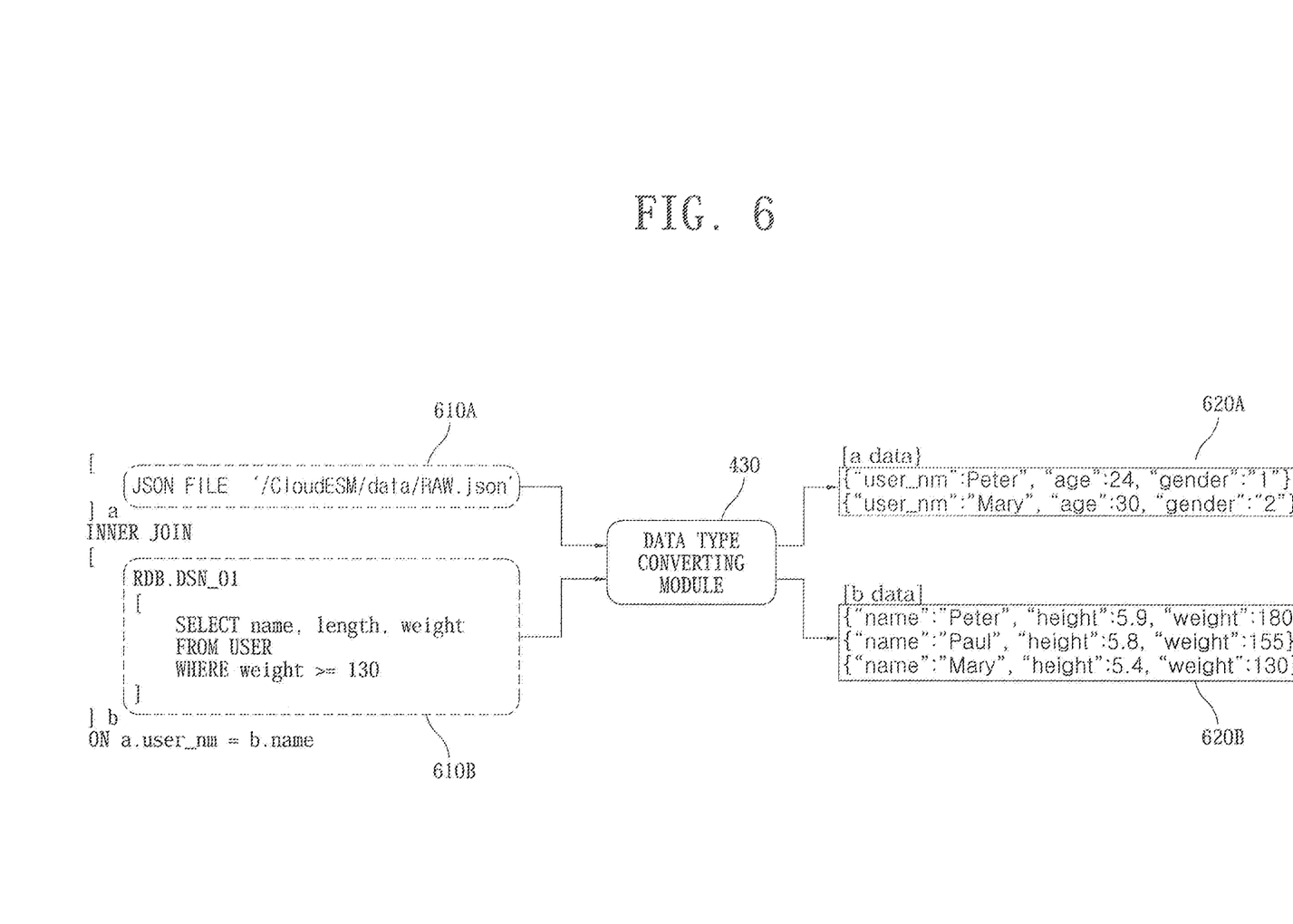
FIG. 6 is a drawing representing a user query which requests for generating the data set from the first data source and the second data source in accordance with one example embodiment of the present disclosure.

As one example, by referring to FIG. 6, the device 1000 may refer to a first search option 610A included in information on the search options, and may use its corresponding file path included in the first search option 610A, to thereby access to a RAW.json, which corresponds to the first data source and of which type is the file. Then, the device 1000 may acquire the entire RAW.json as the first data element. In this case, since a type of the first data element is a type of JSON file, the data type converting module 430 may not need to convert the type of the first data element into a JSON type such as the first converted data element 620A. And the device 1000 may also refer to a second search option 610B included in the information on the search options, and may use the JDBC included in the second search option 610B, to thereby access to a DSN_01, which corresponds to the second data source and of which type is the RDB. Then, the device 1000 may refer to the second search option 610B written in the SQL, to thereby acquire the second data element from the DSN_01, and may allow the data type converting module 430 to convert the type of the second data element into the JSON type such as the second converted data element 620B. Herein, the second data element and the second converted data element 620B may contain same data in different types.

Thereafter, the dive 1000 may perform an INNER JOIN operation, which corresponds to the main joint operation, on the first converted data element 620A and the second converted data element 620B, and thus may generate the data set 2300. Herein, the data set 2300 may contains data corresponding to a following table in the JSON type:

| User_nm | Age | gender | height | Weight |
| --- | --- | --- | --- | --- |
| Peter | 24 | 1 | 5.9 | 180 |
| Mary | 30 | 2 | 5.4 | 130 |

Meanwhile, a process of generating a first data element by using a first sub search option and a second sub search option is explained below by referring to FIGS. 7A and 7B in accordance with one example embodiment of the present disclosure.

Figure 7A:
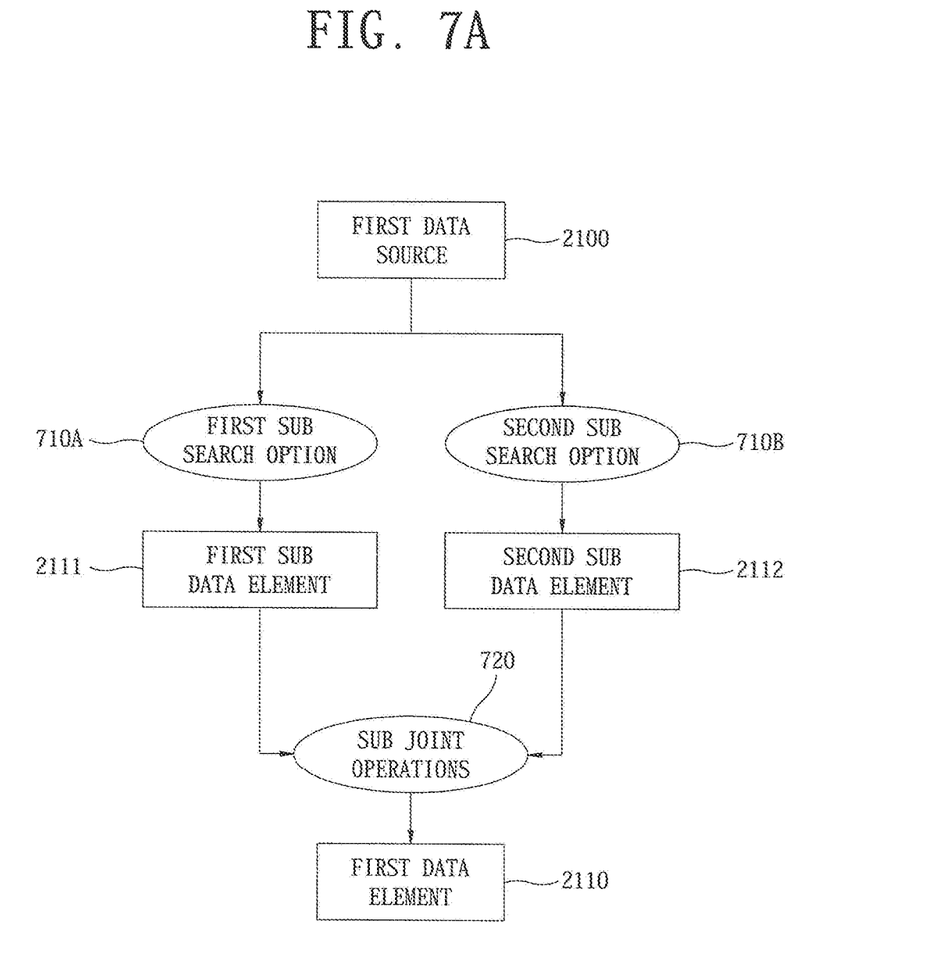
FIGS. 7A and 7B are drawings representing methods for generating a first data element by using a first sub search option and a second sub search option in accordance with one example embodiment of the present disclosure.

First, by referring to FIG. 7A, the device 1000 may refer to or support another device to refer to a first sub search option 710A and a second sub search option 710B, may apply or support another device to apply the first sub search option 710A and the second sub search option 710B, which are included in the information on the search options, to the first data source 2100, to thereby acquire a first sub data element 2111 and a second sub data element 2112, and then may perform or support another device to perform a sub joint operation 720 on the first sub data element 2111 and the second sub data element 2112, to thereby generate the first data element 2110. Herein, the sub joint operation 720 may include at least one of the JOIN operation and the UNION operation, however it may not be limited thereto, and the sub joint operation 720 may represent operations using sub data elements generated from one or more data sources of an identical type.

Figure 7B:
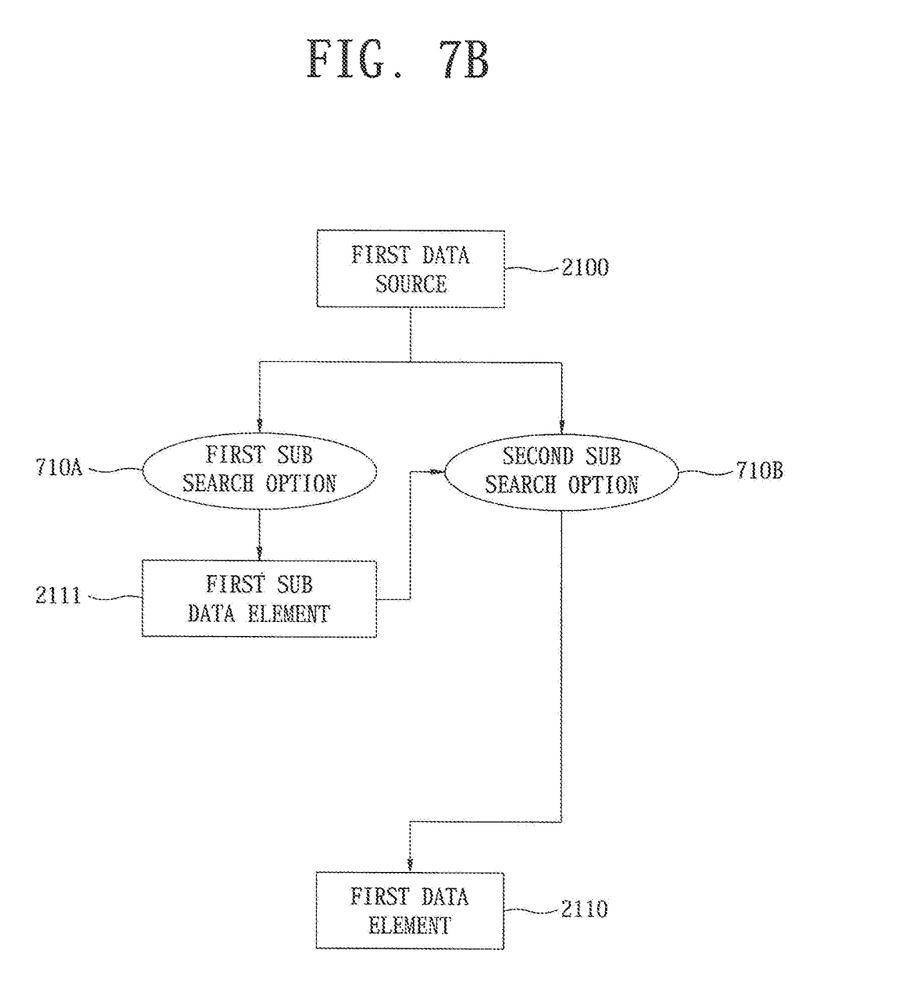

On the other hand, by referring to FIG. 7B, the device 1000 may also refer to or support another device to refer to the first sub search option 710A, may apply or support another device to apply the first sub search option 710A to the first data source 2100, to thereby acquire the first sub data element 2111, and then may generate the first data element 2110 by referring to the first sub data element 2111 and the second sub search option 710B.

For example, by referring to FIG. 6 again, in case data about Peter and Paul are included in a database of the second data source and data about Mary is included in another database of the second data source, the device 1000 may perform the sub joint operation, such as the UNION operation, on the database and the said another database, to thereby generate the second data element.

Meanwhile, processes of performing data processing operations and output operations on the data set to thereby generate the answer for the user query is explained below.

First, when the user query is acquired, the device 1000 may perform or support another device to perform the data processing operations 220 and the output operations 230 on the data set 2300, to thereby generate the answer for the user query 2400.

Herein, the data processing operations 220 may include at least one of an aggregating operation, a data transforming operation, a filtering operation, a sorting operation, a data truncating operation, and an external function calling operation. And, the data output operations 230 may include at least one of a screen displaying operation, a remote RDB storing operation, and a file storing operation.

Moreover, the device 1000 may connect or support another device to connect at least two commands included in the data processing operations 220 and the output operations 230, with one or more delimiters, to thereby apply the commands sequentially. To be specific, the device 1000 may acquire or support another device to acquire an output of a first specific command, among the commands, located just before certain delimiter among the delimiters, and may use or support another device to use the output as an input of a second specific command, among the commands, located just behind the certain delimiter.

The present disclosure has an effect of providing the method for outputting the result of operations using the data sources of the different types.

The present disclosure has another effect of providing the method for outputting the result of the operations using the data sources of the different types by referring to each of languages corresponding to each of the data sources.

The present disclosure has still another effect of providing the method for outputting the result of the operations using the data sources of the different types without replicating data from the data sources.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A computer-implemented method for outputting a result of one or more operations using a first data source and a second data source of different types, comprising steps of:

(a) acquiring, by a device of a computer, a user query from a user device for performing or supporting another device to perform steps of:

accessing a first specific data source and a second specific data source among the first data source and the second data source by referring a Rest API among data source connections, wherein the API is Application Program Interface;

acquiring at least one first data element from the first specific data source and at least one second data element from the second specific data source, wherein the first data element corresponds to a first search option respectively from the first specific data source by referring to information on one or more search options included in the user query, wherein the second data element corresponds to a second search option respectively from the second specific data source by referring to information on the one or more search options included in the user query, wherein the first search option and the second search option are included in the one or more search options, wherein the first data element and the second element are written in each language of languages corresponding to the first specific data source and the second specific data source, wherein the acquiring the first data element includes performing one or more sub joint operations on a first sub data element and a second sub data element to generate the first data element, wherein the first sub data element and the second sub data element are acquired from the first specific data source by sub search options;

setting each data source connection of the data source connections corresponding to the first data source and the second data source by using user name, password, first basic information and second basic information, wherein the first basic information and the second basic information include a data source identifier, a data source name, and a data source type; and performing one or more main joint operations on the first data element and the second data element, resulting in generating data set, by referring to the data source connections of the first data source and the second data source and information on the one or more main joint operations included in the user query, wherein the one or more main joint operations include at least one of a JOIN operation and an UNION operation, wherein the generating data set based on generating a first converted data element and a second converted data element by converting a type of the first data element and a type of the second data element into an identical type; and (b) performing, by another device, one or more data processing operations on the data set includes: generating, by one or more output operations, an answer as a result of the one or more output operations for the user query by referring to information of the data set on the one or more data processing operations and information on the one or more output operations which are included in the user query, wherein the result of the one or more output operations is outputted by using the first data source and the second data source of the different types without moving data sets of the first data source and the second data source of the different types into a single database.

2. The method of claim 1, wherein a type of the first data source and a type of the second data source are selected among a group comprised of a type of a Lucene-based search engine, a type of a database, and a type of a file.

3. The method of claim 1, before the step of (a), further comprising a step of: acquiring first information and second information, the first information or the second information includes at least one of, a Database Name, a User name, and a password, and setting each data source connection of data source connections corresponding to each of the first data source and the second data source by using the first basic information, the second basic information, the first information, and the second information.

4. The method of claim 3, wherein, at the step of (a), the device performs or supports another device to perform a process of accessing the first data source and the second data source by referring to each data source connection of the data source connections.

5. The method of claim 4, wherein, at the step of (a), the device performs or supports another device to perform at least one of acquiring a first sub data element and a second sub data element, wherein the one or more sub joint operations include at least one of the JOIN operation and the UNION operation, and generating the first data element by using the first sub data element and the first search option without performing the one or more sub joint operations.

6. The method of claim 1, wherein, in the step of (a), the device performs or supports another device to perform a process of allowing the one or more main joint operations to be performed, after generating the first converted data element and the second converted data element.

7. The method of claim 1, wherein the device performs or supports another device to perform at least one of
acquiring the first specific data source's corresponding data element by referring to the first specific data source's corresponding search option which has been written in a Lucene, in case a type of the first specific data source is a type of Lucene-based search engine,
acquiring the second specific data source's corresponding data element by referring to the second specific data source's corresponding search option which has been written in a SQL (Structure Query Language), in case a type of the second specific data source is a type of database and
accessing a third specific data source among the first data source and the second data source by referring to the third specific data source's corresponding file path and then acquiring the third specific data source as the third specific data source's corresponding data element, in case a type of the third specific data source is a type of a file.

8. The method of claim 1, wherein the device performs or supports other device to perform:
a process of connecting at least two commands, which are applied after the step of (a), with at least one delimiters,
a process of acquiring an output of a first specific command located before a certain delimiter,
a process of using the output as an input of a second specific command located after the certain delimiter, wherein the first specific command and the second specific command are included in the at least two commands, and wherein the certain delimiter is included in the at least one delimiters.

9. The method of claim 1, wherein, at the step of (b), the data processing operations include at least one of an aggregating operation, a data transforming operation, a filtering operation, a sorting operation, a data truncating operation, and an external function calling operation.

10. The method of claim 1, wherein, at the step of (b), the data output operations include at least one of a screen displaying operation, a remote database storing operation, and a file storing operation.

11. A device for outputting a result of one or more operations using a first data source and a second data source of different types, comprising:
at least one memory that stores instructions; and
at least one processor configured to execute the instructions to perform processes of:
acquiring a user query from a user device for performing or supporting another device to perform steps of:
accessing a first specific data source and a second specific data source among the first data source and the second data source by referring a Rest API among data source connections, wherein the API is Application Program Interface;
acquiring at least one first data element from the first specific data source and at least one second data element from the second specific data source, wherein the first data element corresponds to a first search option respectively from the first specific data source by referring to information on one or more search options included in the user query, wherein the second data element corresponds to a second search option respectively from the second specific data source by referring to information on the one or more search options included in the user query, wherein the first search option and the second search option are included in the one or more search options, wherein the first data element and the second element are written in each language of languages corresponding to the first specific data source and the second specific data source, wherein the acquiring the first data element includes performing one or more sub joint operations on a first sub data element and a second sub data element to generate the first data element, wherein the first sub data element and the second sub data element are acquired from the first specific data source by sub search options;
setting each data source connection of the data source connections corresponding to the first data source and the second data source by using user name, password, first basic information and second basic information, wherein the first basic information and the second basic information include a data source identifier, a data source name, and a data source type; and
performing one or more main joint operations on the first data element and the second data element, resulting in generating data set, by referring to the data source connections of the first data source and the second data source and information on the one or more main joint operations included in the user query, wherein the one or more main joint operations include at least one of a JOIN operation and an UNION operation, wherein the generating data set based on generating a first converted data element and a second converted data element by converting a type of the first data element and a type of the second data element into an identical type; and (b) a device performing or supporting another device to perform one or more data processing operations on the data set includes: generating, by one or more output operations, an answer as a result of the one or more output operations for the user query by referring to information of the data set on the one or more data processing operations and information on the one or more output operations which are included in the user query, wherein the result of the one or more output operations is outputted by using the first data source and the second data source of the different types without moving data sets of the first data source and the second data source of the different types into a single database.

12. The device of claim 11, wherein a type of the first data source and a type of the second data source are selected among a group comprised of a type of a Lucene-based search engine, a type of a database, and a type of a file.

13. The device of claim 11, wherein the processor further performs or supports another device to perform:
   (I) processes of
      (i) acquiring first basic information and second basic information, the first basic information or the second basic information includes at least one of a data source, a data source name, and a data source type,
      (ii) acquiring first information and second information, the first information or the second information includes at least one of a Database Name, a User name, and a password, and
      (iii) setting each data source connection of data source connections corresponding to each of the first data source and the second data source by using the first basic information, the second basic information, the first information, and the second information.

14. The device of claim 13, wherein, at the process of (i) in the processes of (I), the processor performs or supports another device to perform (i-1) a process of accessing the first data source and the second data source by referring to each connection of the data source connections, (i-2) a process of acquiring the first data element and the second element by referring the first search option and the second search option, and then (i-3) a process of generating a first converted data element and a second converted data element by converting a type of the first data element and a type of the second data element, and wherein, at the process of (ii) in the processes of (I), the processor performs or supports another device to perform a process of performing one or more main joint operations on the first converted data element and the second converted data element, resulting in generating data set, by referring to information on the one or more main joint operations.

15. The device of claim 14, the processor performs or supports another device to perform at least one of a process of acquiring a first sub data element and a second sub data element, wherein the sub joint operations include at least one of the JOIN operation and the UNION operation, a process of acquiring the first sub data element, and then a process of generating the first data element by using the first sub data element and the second search option without performing the sub joint operations.

16. The device of claim 14, wherein the processor performs or supports another device to perform a process of allowing the main joint operations to be performed after generating the first converted data element and the second converted data element.

17. The device of claim 14, wherein the processor performs or supports another device to perform at least one of
   a process of acquiring the first specific data source's corresponding data element by referring to the first specific data source's corresponding search option which has been written in a Lucene, in case a type of the first specific data source is a type of Lucene-based search engine,
   a process of acquiring the second specific data source's corresponding data element by referring to the second specific data source's corresponding search option which has been written in a SQL (Structure Query Language), in case a type of the second specific data source is the type of a database, and
   a process of accessing a third specific data source among the first data source and the second data source by referring the third specific data source's corresponding file path and then a process of acquiring the third specific data source as the third specific data source's corresponding data element, in case a type of the third specific data source is a type of a file.

18. The device of claim 11, wherein the processor performs or supports other device to perform
   a process of connecting at least two commands, which are applied after the acquiring the at least one first data element and the at least one second data element, with at least one delimiters,
   a process of acquiring an output of a first specific command located before a certain delimiter, and
   a process of using the output as an input of a second specific command located after the certain delimiter, wherein the first specific command and the second specific command are included in the at least two commands, and wherein the certain delimiter is included in the delimiters.

19. The device of claim 11, wherein the data processing operations include at least one of an aggregating operation, a data transforming operation, a filtering operation, a sorting operation, a data truncating operation, and an external function calling operation.

20. The device of claim 11, wherein the data output operations include at least one of a screen displaying operation, a remote database storing operation, and a file storing operation.

* * * * *